United States Patent Office 3,407,092
Patented Oct. 22, 1968

3,407,092
COATED TIRE CORD YARN
Thomas B. Gage and Thomas C. Mayberry, Wilmington, Del., assignors to E. I. du Pont de Nemours and Company, Wilmington, Del., a corporation of Delaware
No Drawing. Filed Apr. 6, 1965, Ser. No. 446,082
4 Claims. (Cl. 117—138.8)

ABSTRACT OF THE DISCLOSURE

A tire cord yarn composed of continuous filament nylon having a cross-linkable copolymer coating based on the lower alkyl esters of acrylic acid on its filaments in an amount of about 1 to 5 percent, based on the weight of the yarn. Preferably the alkyl acrylate is copolymerized with, by weight, from 0.5 to about 5 percent N-methylolacrylamide and 0.5 to about 20 percent acrylamide.

This invention relates to yarns to be used in the manufacture of reinforced rubber articles such, for example, as tires.

It is known that cords of synthetic polymer, continuous-filament yarns can be made suitable for incorporation in rubber by coating or impregnating the yarns with substances having a latex base which serves to bond the cord and rubber. Among such substances may be mentioned natural rubber and synthetic rubber lattices or mixtures thereof with reisns or resin-forming materials. However, such substances have produced, at best, only marginal improvements in the properties of the resulting cord and rubber assembly.

It is an object of this invention to provide synthetic polymer, continuous-filament yarns having improved cord strength retention after flex fatigue when the yarns are used for the reinforcement of rubber articles such as tires, belts, and hose, and a method of producing those yarns.

This and other objects are attained in accordance with the present discovery in a continuous-filament nylon yarn having as a coating on its filaments about 1 to 5 percent, based on the weight of the yarn, of a cross-linkable acrylic copolymer. Upon employing this yarn as, for example, cord for the reinforcement of rubber articles subject to severe flexing, it is found that cord strength is better retained and the cords are more durable than cords of the same base material that have not been provided with this acrylic coating.

Suitable cross linkable acrylic copolymers are those based on the lower alkyl esters of acrylic acid, e.g., esters of acrylic acid with aliphatic alcohols having 2 to 8 carbon atoms in their alkyl chains. The alkyl acrylate is copolymerized with other monomers which provide cross-linking sites. Preferably, the alkyl acrylate will be copolymerized with, by weight, from 0.5 to about 5.0 percent N-methylolacrylamide and 0.5 to about 20 percent acrylamide. If desired, a small portion, i.e., of up to 10 to 15 percent of the acrylate ester may be replaced with a corresponding amount of a lower alkyl ester of methacrylic acid. Typical copolymers of this type are commercially available and are described in U.S. Patent 3,157,562 to which reference can be made. Other acrylic polymers such as a terpolymer containing 83 percent ethylacrylate, 15 percent methylacrylate and 2 percent methacrylic acid, and a terpolymer containing 65 percent ethylacrylate, 36 percent methylacrylate and 4 percent acrylic acid also have been found to be useful for purposes of the present invention.

These cross-linkable acrylic copolymers are empolyed in the present invention in the form of an aqueous dispersion or emulsion. The concentration of the emulsion is not critical and any concentration can be used that in conjunction with the circumstances of application results in the deposition of 1 to 5 percent of solids on the yarn. Preferably a relatively low concentration of about 1 to 10 weight percent is used, and the solids deposited on the yarn are maintained at about 2 to 3 percent.

For purposes of the present discovery, the acrylic copolymers are applied to yarn in any convenient manner now employed for applying finishes, adhesives and other coating materials. For example, the yarn can be immersed in a bath of the emulsion, passed over a roller in a trough of the emulsion or the like. A conventional catalyst can be included in the emulsion in the usual amount to aid in curing or cross-linking the copolymer. Preferably, however, the catalyst is omitted and the coating is heated to cause cross-linking.

Generally, the invention is practiced with yarns of nylons such as polyhexamethylene adipamide, polycaproamide, the reaction product of dodecane dioic acid and bispara-aminocyclohexyl) methane or their amide forming derivatives, melt-blend nylons such as those described in British Patent 918,637, or other nylon or copolymers thereof. These yarns and their method of preparation are well known and are described in the technical literature. The yarns are conventionally treated with a spin finish, generally for lubricating purposes. The cross-linkable acrylic copolymers of this invention are applied over the spin finish after the yarn has been drawn, without adverse effect. The copolymer can be applied to the yarn before, during or after twisting to a cord structure; however application before twisting is preferred to insure uniform coating on each filament.

After application of the copolymer, the coating yarn is dried by heating at an elevated temperature at constant length. Several yarns are twisted to cord form, and a conventional latex adhesive is applied prior to embedding the cords in the rubber article. Any desired adhesive can be used; suitable latex adhesives are disclosed in U.S. Patents 3,050,820 and 2,917,422, but others can be employed.

In the following examples, parts and percentages are by weight unless otherwise indicated or apparent.

EXAMPLE I

A drawn polyhexamethylene adipamide yarn having 140 filaments and a denier of 840 is prepared in a conventional manner. The yarn contains 1.8% by weight of a lubricant, the principal ingredient of which is coconut oil.

A sample of this yarn is passed through a bath of a 4% by weight aqueous emulsion of an ethyl acrylate/N-methylol - acrylamide/acrylamide (94/5/1) copolymer. The yarn is dried at constant length for 2 minutes at 93° C. and is found to have picked up 3% by weight of the acrylic copolymer. The yarn is then given 6 t.p.i. (2.4 turns per centimeter) of S-twist, and 3 ends of the twisted yarns plied together with 6 t.p.i. (2.4 turns per centimeter) of Z-twist. The cords are then treated with the conventional resorcinol-formaldehyde-latex (RFL) dip, the latex used being a styrene-butadiene-vinyl pyridine terpolymer. The latex adhesive dip has a concentration of 20% "solids" by weight. The cords are dried at constant length for 2 minutes at 150° C. and the dip cured at 200° C. for 0.5 minute. During the curing step, the cords are relaxed 1.8%. The cured cords contain 5% by weight of the dip, based on the original weight of the yarn.

A second sample of the yarn is treated in like manner except that it is not passed through the bath containing the acrylic copolymer. This yarn contains 5% by weight of the RFL dip and serves as a control.

Both the acrylic-copolymer-treated and the control cord are used to build a conventional 7.50 x 14, 2-ply tire using a typical blend of natural and styrene-butadiene rubber stock. The tires are inflated to 15 p.s.i.g. pressure (2 atmospheres absolute pressure) and subjected to the well-known wheel test which comprises running a tire under a given load against a driven steel drum to simulate actual use. An 1185-pound (537-kilogram) load is applied and the drum, 17.6 feet (5.36 meters) in circumference, rotated to give a speed of 35 m.p.h. (56.3 kilometers per hour).

The test is run at an ambient temperature of 38° C. and the tires are run to failure. The tires containing the cords treated with the acrylic copolymer run 2055 miles (3307 kilometers). The cords are tested and found to have lost 21% of their strength for each thousand miles (1609 kilometers). The control tire, which is representative of those sold commercially, runs only 1130 miles (1819 kilometers) under these test conditions. The cords lose 44% of their strength for each thousand miles (1609 kilometers).

EXAMPLE II

A drawn polyhexamethylene adipamide yarn having 140 filaments and a denier of 840 is prepared in a conventional manner. The yarn contains 1.8% by weight of the lubricant as in Example I.

Three different samples of this yarn are treated with a latex. A fourth sample remains untreated. One sample is treated with the acrylic copolymer of Example I, a second portion is treated with a synthetic polyisoprene latex, and the third sample is treated with natural rubber latex. The latex concentration is 40% solids by weight in all cases. Application to the yarn is made by running the yarn through a slot into which the latex is pumped at a rate sufficient to provide a coating of 2% solids based on the weight of the yarn. The latex treated and the untreated yarn are then separately twisted to cords by applying 7 t.p.i. (2.8 turns per centimeter) of S-twist to the yarn and plying 3 of these yarns together with 7 t.p.i. (2.8 turns per centimeter) of Z-twist.

The cords are then treated, in turn, with an RFL dip essentially the same as in Example I. The cords are dried at constant length for 2 minutes at 150° C. and the dip cured with a net stretch of 5% at 190° C. for 0.5 minute. The cured cords contain 5% by weight of the dip, based on the original weight of the yarn.

The cords of this example are then used to build a 7.50 x 14, 2-ply tire using bands of each of the cords and the rubber stock of Example I. Four side-by-side bands are used, with all of the cords in a given band being the same. The tire is then tested as described in Example I. The tire is run for a total of 3,000 miles (4828 kilometers), the cords removed, and the cord strength loss per thousand miles (1,609 kilometers) determined. The acrylic copolymer reduced cord strength loss by 50% compared to the untreated control. The natural rubber latex reduced cord strength loss by only 10%, and the synthetic polyisoprene latex caused a 30% increase in cord strength loss.

As evidenced by the foregoing examples, the yarns of this invention provide cord structures which show a surprising improvement in strength retention and durability when the cords are subsequently used for the reinforcement of articles in which severe flexing occurs. It will be apparent that the yarns of this invention provide tire cords superior than any known heretofore. Using equivalent amounts, these cords may be utilized to produce more durable tires than do conventional cords; or, if desired, the cord content of tires can be reduced to provide tires of equivalent durability.

While the invention has been exemplified with polyamide yarns, polyester yarns may be used if desired.

What is claimed is:

1. Nylon tire cord yarn comprising yarn composed of continuous filament nylon, the yarn having on the surface of its filaments a coating of about 1 to 5 percent by weight based on the yarn of a copolymer of about 0.5 to 5 percent of N-methylolacrylamide, about 0.5 to 20 percent of acrylamide and the remainder a lower alkyl acrylate, wherein up to 15% of said acrylate may be replaced with a lower alkyl methacrylate.

2. Nylon tire cord yarn in accordance with claim 1 in which the copolymer consists essentially, by weight, of 94 percent ethyl acrylate and 5 percent N-methylolacrylamide and one percent of acrylamide and is present in an amount of about 2 to 3 weight percent.

3. Polyester tire cord yarn comprising yarn composed of continuous filament polyester, the yarn having on the surface of its filaments a coating of about 1 to 5 percent by weight based on the yarn of a copolymer of about 0.5 to 5 percent of N-methylolacrylamide, about 0.5 to 20 percent of acrylamide and the remainder a lower alkyl acrylate, wherein up to 15% of said acrylate may be replaced with a lower alkyl methacrylate.

4. Polyester tire cord yarn in accordance with claim 3 in which the copolymer consists essentially, by weight, of 94 percent ethyl acrylate, 5 percent N-methylolacrylamide and one percent of acrylamide and is present in an amount of about 2 to 3 weight percent.

References Cited

UNITED STATES PATENTS

| | | | |
|---|---|---|---|
| 2,819,189 | 1/1958 | Sven et al. | 117—138.8 X |
| 3,157,562 | 11/1964 | Kine et al. | 161—227 X |
| 3,236,685 | 2/1966 | Caldwell et al. | 117—161 X |

WILLIAM D. MARTIN, *Primary Examiner.*

JOHN E. MILLER, *Assistant Examiner.*